(No Model.)
B. WHEELER.
CLAMP FOR HOLDING WELL POLES.
No. 299,887. Patented June 3, 1884.
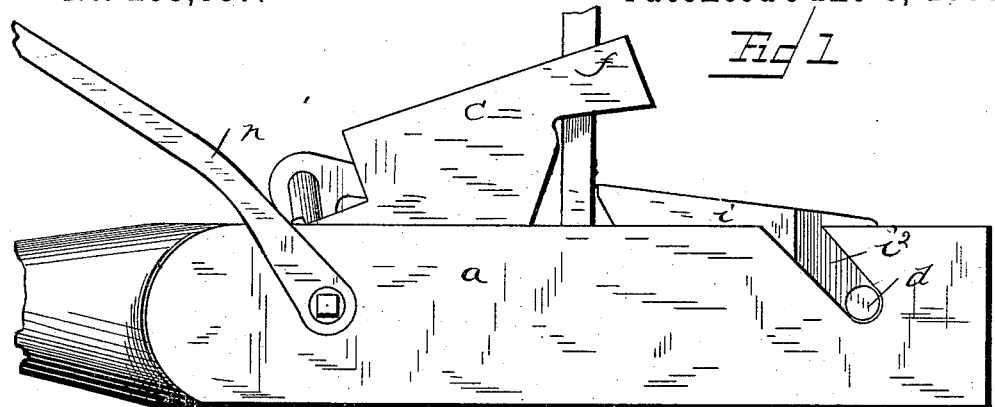
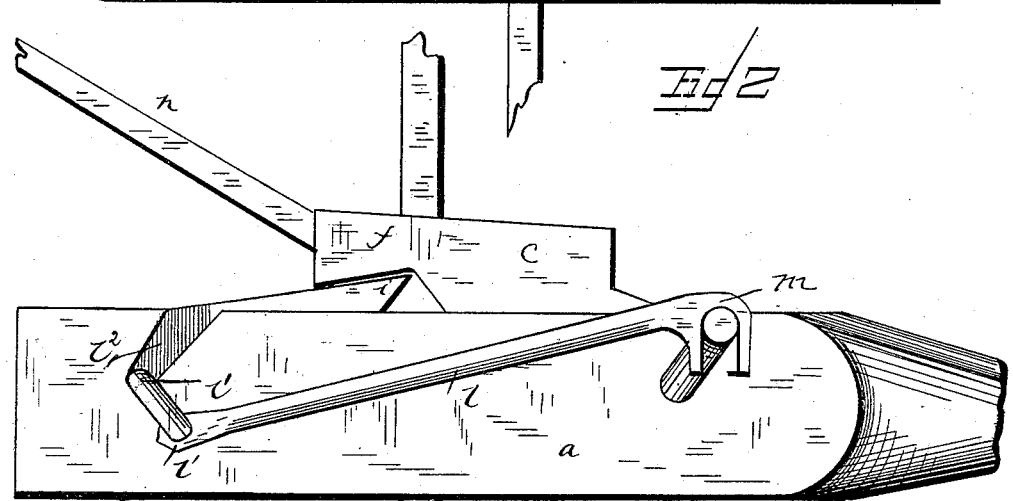
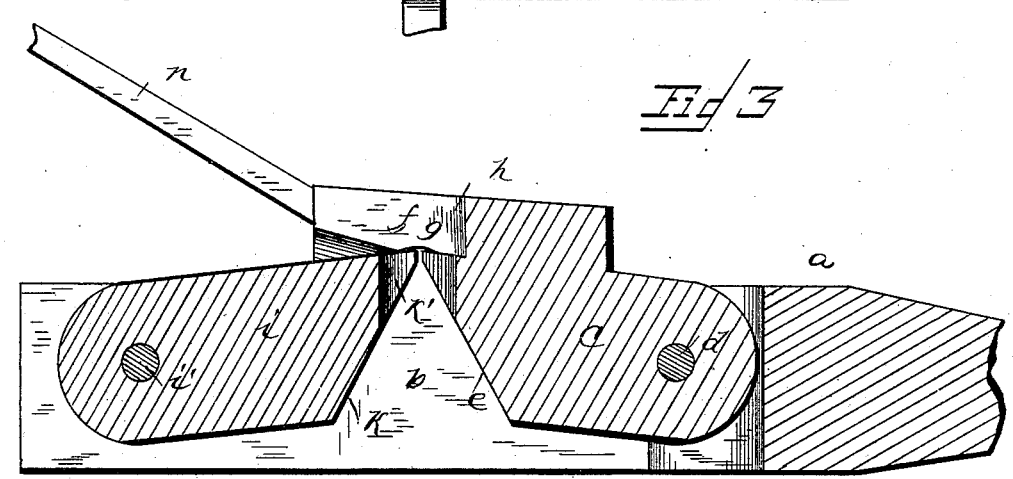
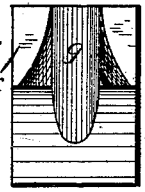
WITNESSES
F. L. Durand
E. G. Diggers
INVENTOR
B. Wheeler
by Loct Snowles
Attorneys

UNITED STATES PATENT OFFICE.

BRAYTON WHEELER, OF SAGINAW, MICHIGAN.

CLAMP FOR HOLDING WELL-POLES.

SPECIFICATION forming part of Letters Patent No. 299,887, dated June 3, 1884.

Application filed March 15, 1884. (No model.)

*To all whom it may concern:*

Be it known that I, BRAYTON WHEELER, a citizen of the United States, residing at Saginaw, in the county of Saginaw and State of Michigan, have invented a new and useful Clamp for Holding Well-Poles, of which the following is a specification, reference being had to the accompanying drawings.

This invention has relation to wrenches for catching and holding the well-poles of salt-wells in case of breakage of the drawing rope or mechanism by which the iron well-poles are being withdrawn from the well-tubing, and thus preventing damage to the tubing and the consequent loss of the well should the pole fall to the bottom of the well; and it consists in the construction and novel arrangement of parts, as will be hereinafter fully described, and particularly pointed out in the claims.

Figure 1 is a side elevation of a device embodying the improvements of my invention, the gripping-dogs being shown held out of biting contact with the well-pole, which is represented as being let down into the well. Fig. 2 is a side elevation of the device, taken from the side opposite that shown in Fig. 1; and Fig. 3 is a vertical longitudinal sectional view. Fig. 4 is a detail view.

Referring by letter to the accompanying drawings, $a$ designates the frame of the device, which is slotted vertically throughout nearly its entire length, the slot $b$ leading out at one end of the frame. This frame is supported above the well-tubing in any suitable manner that will provide the requisite strength, and is provided near its closed end with a dog, $c$, pivoted on a transverse crank-shaft, $d$, and is provided with an inner upwardly-beveled face, $e$, extending from the lower face of the dog to the upper inwardly-projecting arms, $ff$, of the dog $c$. These arms $ff$ have inner curved faces near the forward ends, which widens the recess $g$ between them at their lower edges. The recess $g$ extends back over the semi-oval-shaped recess $h$ in the biting edge of the dog $c$, and is adapted to guide the rectangular portions of the well-pole. The other dog, $i$, is pivoted on a crank-shaft, $i'$, removably secured in open inclined bearings $i^2$, near the open end of the frame $a$. This dog $i$ is also provided with an under bevel, $k$, at its inner end, and a semi-oval recess, $k'$, in its biting edge. When the two biting edges meet upon the well-pole, either upon the round or rectangular portions, they will bite upon it and hold it, and thereby prevent it from falling to the bottom of the well in case the draw-rope or drawing mechanism should break. The cranks on the ends of the crank-shafts are connected by a rod, $l$, having an eye, $l'$, which is slipped upon one crank, and a bifurcated hook end, $m$, which is dropped down over the other crank, so that when the crank-shaft $d$ is operated by the lever $n$, either to open the dogs to permit the well-pole to be lowered into the well or to close the dogs upon the well-pole, both cranks will be operated at the same time. When it is necessary—for instance, if the well-pole should slip between the dogs—it can be instantaneously stopped by bearing down on the lever $n$, which operates both dogs at the same time.

This device is simple, cheap, and efficient, and is of almost incalculable value, as it not only prevents damage to the well-tubing, but prevents the loss of the use of the well.

Having thus fully described my invention, what I claim as new, and desire to secure by Letters Patent of the United States, is—

1. In a device for stopping the descent of well-poles in salt-wells when the draw-rope or drawing mechanism becomes broken, the combination, with the slotted frame, of the pivoted dogs having beveled biting edges provided with semi-oval recess in said biting edges, said dogs being pivoted on crank-shafts having bearings in the frame, the cranks of said shafts being connected by a hook-rod, one of the dogs being provided with projecting arms above its biting edge, and the other dog being pivoted on a removable shaft, substantially as specified.

2. The combination, with the slotted frame, the pivoted dog having the inwardly-projecting arms and the semi-oval recess in its biting edge, and the other dog pivoted to a removable crank-shaft, and having a semi-oval recess in its biting edge, of the rod for connecting the cranks of the crank-shafts and the lever for operating said dogs, substantially as specified.

In testimony that I claim the foregoing as my own I have hereto affixed my signature in presence of two witnesses.

BRAYTON WHEELER.

Witnesses:
ALBERT TRASK,
G. K. GROUT.